(No Model.)

J. W. COLLINS.
Device for Clearing the Meshes of Screens or Bolts.

No. 227,883. Patented May 25, 1880.

WITNESSES
W. C. Adams.
Wm M. Stanley.

INVENTOR
John W. Collins
per M. E. Dayton
Attorney

United States Patent Office.

JOHN W. COLLINS, OF CHICAGO, ILLINOIS.

DEVICE FOR CLEARING THE MESHES OF SCREENS OR BOLTS.

SPECIFICATION forming part of Letters Patent No. 227,883, dated May 25, 1880.

Application filed March 10, 1880. (No model.)

*To all whom it may concern:*

Be it known that I, JOHN W. COLLINS, of Chicago, State of Illinois, have invented certain new and useful Improvements in Devices for Clearing the Meshes of Screens or Bolts of Flour-Mills; and I do hereby declare that the following is a full, clear, and exact description thereof, reference being had to the accompanying drawings, and to the letters of reference marked thereon, which form a part of this specification.

My invention relates to devices for clearing the meshes of screens or bolts of flouring-mills; and it consists in a beater composed of a rotating shaft provided with numerous flexible cords secured at one end to the shaft, said beater being, in its application, supported in proximity to the screen or bolt, so that when the shaft is rotated the cords or beaters proper thereto attached will be thrown out by centrifugal action, and will strike the cloth of such screen or bolt, and thereby dislodge the obstructions from the meshes.

Figure 1:
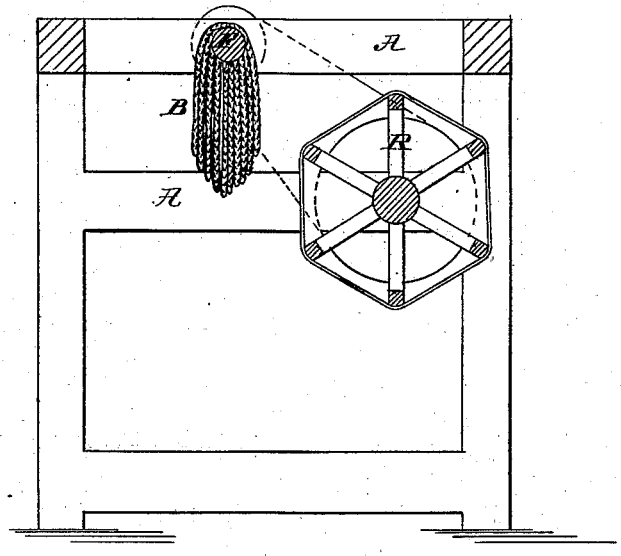
Figure 2:
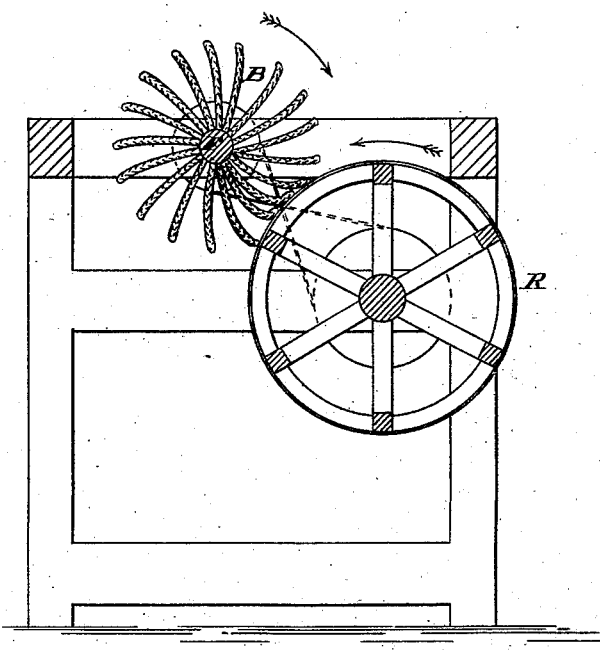

In the drawings, Figure 1 is a transverse vertical section of a bolting-reel combined with the beater described at rest; and Fig. 2 is a similar section, showing the beater and reel in operation.

A is the frame supporting the working parts in proper relation. R is a rotating reel, and F is the beater-shaft, provided with the flexible cords or beaters proper, B. Said beaters are, preferably, made from hemp or other material having long tenacious filaments or fibers, and so fabricated as, while soft and flexible, to retain the fibers in the structure in use. The beaters are distributed evenly throughout the length of the shaft F, and are of such number, preferably, as in operation to successively strike the entire surface of the screen or bolt.

The beaters may be formed on a continuous heading, similar to fringe, and spirally wound upon the shaft.

The shaft F is so placed with reference to the bolt that when said shaft is at rest the flexible beaters B hang out of contact with the bolt-cloth, as seen in Fig. 1, but that when said shaft is rotated the beaters, thrown out by centrifugal force, will strike the cloth, as shown in Fig. 2.

By reason of the flexible character of the beaters and the nature of the material of which they are formed, the blows struck by them will be soft, while sufficient, and will not have the effect of rapidly wearing the screen.

When a rotating reel is combined with the beater, as shown in the drawings, the two may be rotated in opposite directions, as indicated in Fig. 2, and by making the distance from center to center of the reel and beater shafts equal to the diameter of the reel, and rotating both at the same speed, the action of the beaters will be substantially destitute of any drawing or rubbing action hurtful to the screen-cloth, but will be simply that of a succession of soft blows, gently vibrating the cloth radially to the reel. The same effect may, of course, be attained in the use of a larger reel and shorter beaters by varying their relative speeds.

The beaters may have a constant or an intermittent motion, as desired.

Having thus described my invention, I claim—

1. In combination with the screen or bolt of a separator, a rotating shaft provided with numerous beaters sufficiently flexible to be thrown out radial to the shaft to strike the reel when rotated and to hang from the shaft when at rest, substantially as described.

2. In combination with a bolt or reel, the stationary shaft F, provided with the beaters B, flexible, as described, and supported with reference to the reel in such position that the beaters hang clear of the reel when the shaft F is at rest, but strike the reel when said shaft is rotated, substantially as described.

In testimony that I claim the foregoing as my invention I affix my signature in presence of two witnesses.

JOHN W. COLLINS.

Witnesses:
M. E. DAYTON,
WILLIAM M. STANLEY.